(12) United States Patent
Yoneda et al.

(10) Patent No.: US 7,830,049 B2
(45) Date of Patent: Nov. 9, 2010

(54) MOTOR AND DISK DRIVE USING THE SAME

(75) Inventors: Tomohiro Yoneda, Kyoto (JP); Keita Hamakawa, Kyoto (JP); Takayuki Iwase, Kyoto (JP); Hiromasa Fujii, Kyoto (JP); Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 231 days.

(21) Appl. No.: 12/142,828

(22) Filed: Jun. 20, 2008

(65) Prior Publication Data

US 2009/0174272 A1   Jul. 9, 2009

(30) Foreign Application Priority Data

Jun. 25, 2007 (JP) ............... 2007-166699

(51) Int. Cl.
- H02K 5/24 (2006.01)
- H02K 7/00 (2006.01)
- G11B 19/20 (2006.01)

(52) U.S. Cl. ............ 310/51; 310/90; 310/90.5; 360/98.07; 384/121

(58) Field of Classification Search .......... 384/121; 310/90, 90.5, 51; 360/98.07
See application file for complete search history.

(56) References Cited

U.S. PATENT DOCUMENTS

| | | | |
|---|---|---|---|
| 4,864,442 A * | 9/1989 | Miyazawa et al. | 360/99.12 |
| 4,965,476 A | 10/1990 | Lin | |
| 5,623,382 A * | 4/1997 | Moritan et al. | 360/99.08 |
| 6,005,746 A * | 12/1999 | Papst | 360/98.07 |
| 6,097,129 A * | 8/2000 | Furtwangler et al. | 310/256 |
| 6,172,847 B1 * | 1/2001 | Sakatani et al. | 360/99.08 |
| 6,483,209 B1 * | 11/2002 | Horng et al. | 310/51 |
| 6,920,013 B2 * | 7/2005 | Nishimura et al. | 360/99.08 |
| 7,008,109 B2 | 3/2006 | Gomyo et al. | |
| 7,030,527 B2 * | 4/2006 | Tsuda et al. | 310/90 |
| 7,118,278 B2 | 10/2006 | Gomyo et al. | |
| 7,265,464 B2 * | 9/2007 | Chen | 310/68 B |
| 7,345,392 B2 * | 3/2008 | Hafen et al. | 310/90 |
| 2003/0168923 A1 | 9/2003 | Gomyo et al. | |
| 2004/0190410 A1 * | 9/2004 | Kuwajima et al. | 369/47.1 |
| 2006/0082229 A1 * | 4/2006 | Xu et al. | 310/67 R |
| 2006/0158052 A1 * | 7/2006 | Yamamoto | 310/90 |
| 2008/0130168 A1 * | 6/2008 | Higuchi et al. | 360/99.08 |

FOREIGN PATENT DOCUMENTS

JP   2002-262523 A  * 9/2002

* cited by examiner

*Primary Examiner*—Burton Mullins
(74) *Attorney, Agent, or Firm*—Keating & Bennett, LLP

(57) ABSTRACT

A thrust yoke is fixed into a second recessed portion of a base with adhesive. The second recessed portion has a first surface to be in contact with the bottom surface of the thrust yoke, and a second surface axially opposing the bottom surface of the thrust yoke with a gap therebetween. The thrust yoke has a bent portion at its radial end. The bent portion is bent downward. The thrust yoke also has a protruding portion extending downward from the bent portion. The protruding portion axially opposes the second surface of the second recessed portion of the base with a gap therebetween.

15 Claims, 15 Drawing Sheets

MOTOR AND DISK DRIVE USING THE SAME

BACKGROUND OF THE INVENTION

1. Field of the Invention

The present invention relates to a motor for spinning a disk-shaped storage medium and to a disk drive mounted with the motor.

2. Description of the Related Art

An exemplary known motor is described in JP 2006194400 A and its counterpart U.S. patent publication No. US 2006/0158052 A1. In the motor, magnetic attraction between a rotor magnet and a yoke made of magnetic material exerts a force in the opposite direction to the direction in which the rotor floats. That is, the magnetic attraction generated between the rotor magnet and the yoke is a reaction force to the force that makes the rotor float.

If the yoke is attached obliquely relative to the rotor magnet, the magnetic attraction is uneven in the circumferential direction of the rotor magnet, thus making rotation of the rotor unstable. Particularly, a spindle motor used for spinning a disk-shaped storage medium (hereinafter, simply referred to as a disk) in conjunction with a magnetic head may encounter the following problem. In the spindle motor, a gap between the disk and the magnetic head is very small. Therefore, instable rotation of the rotor may cause the disk to come into contact with the magnetic head. In order to prevent this, the yoke needs to be attached to the base without being inclined relative to the rotor magnet.

In addition, the recent price decline on disk drives has intensified demands for price reduction for motors to be mounted to the disk drives.

SUMMARY OF THE INVENTION

Preferred embodiments of the present invention provide a motor for a disk drive. The motor includes a rotor, a stationary unit, and a bearing unit. The rotor includes a rotor magnet that rotates about a central axis of the motor. The bearing unit supports the rotor to be rotatable.

The stationary unit includes a stator and a thrust yoke. The stator is arranged to oppose the rotor magnet with a gap therebetween. The thrust yoke is arranged below the rotor magnet to axially oppose the rotor magnet with a gap therebetween. The thrust yoke is made of magnetic material, for example.

The thrust yoke has a substantially flat portion, a bent portion, and a protruding portion. The substantially flat portion axially opposes the rotor magnet with a gap therebetween. The bent portion is formed at least one of the inner periphery and the outer periphery of the substantially flat portion and is bent downward from the substantially flat portion. The protruding portion extends downward from the bent portion.

Since the bent portion extends downward from at least one of the inner periphery and the outer periphery of the substantially flat portion and the protruding portion extends downward from the bent portion, the thrust yoke can be made thin and the axial gap between the rotor and the thrust yoke can be reduced. Further, the thickness of the motor can be reduced.

Moreover, the area of contact between an upper surface of a base and the thrust yoke is reduced in the motor of the preferred embodiments of the present invention. Thus, it is possible to prevent deterioration of parallelism of the thrust yoke relative to the base in a circumferential direction and a radial direction, which deterioration comes from the contact between the base and the thrust yoke. That is, it is possible to reduce inclination of the thrust yoke relative to the base in the circumferential and radial directions. As a result, the axial gap between the thrust yoke and the rotor magnet can be made uniform in the circumferential direction. Accordingly, it is possible to reduce vibration caused by the inclination of the thrust yoke as well as noise due to the vibration in the rotor.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
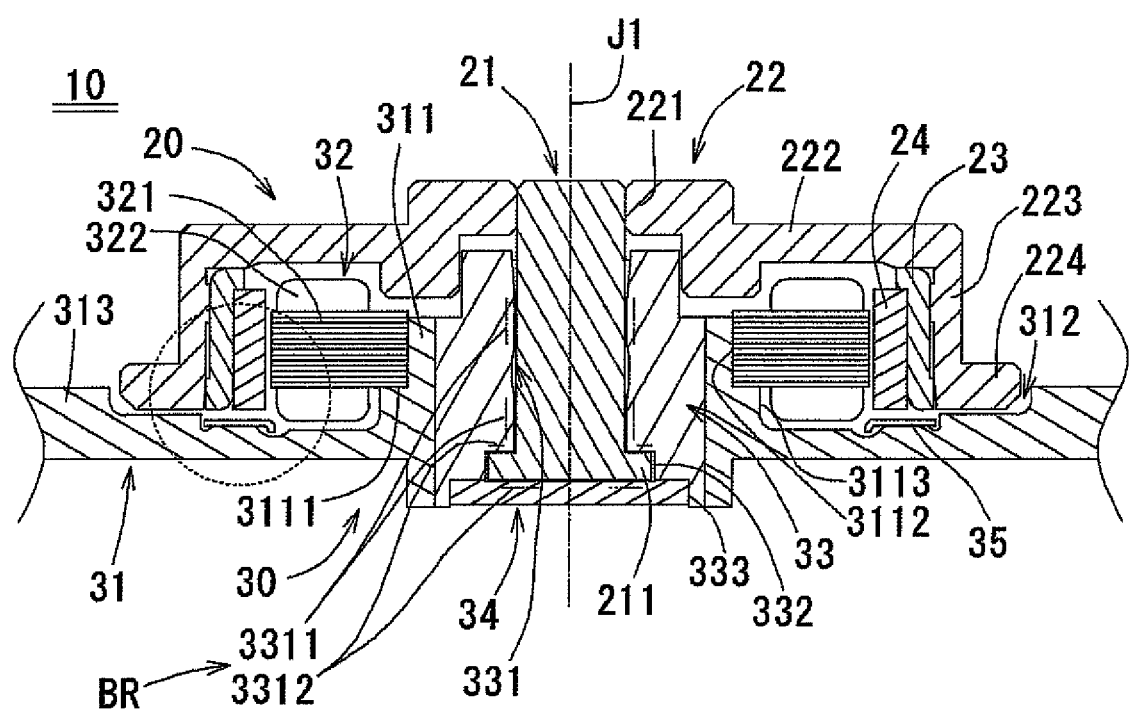
FIG. 1 is a cross-sectional view of a motor according to a first preferred embodiment of the present invention, taken along with a plane containing a center axis thereof.

Referring to FIGS. 1 through 11, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a center axis, and a radial direction indicates a direction perpendicular to the center axis.

First Preferred Embodiment

A motor according to a first preferred embodiment of the present invention is described referring to FIG. 1. FIG. 1 is a cross-sectional view of the motor of the first preferred embodiment, taken along a center axis J1 thereof.

Referring to FIG. 1, a motor 10 includes a rotor 20, a stationary unit 30, and a bearing unit BR. The rotor 20 includes a rotor magnet 24 that rotates about the central axis J1. The bearing unit BR supports the rotor 20. The stationary unit 30 includes a stator 32 that is arranged to oppose the rotor magnet 24 in a radial direction to generate a magnetic field, and a base 31 arranged to hold the stator 32.

The rotor 20 includes a shaft 21, a rotor hub 22, and a rotor yoke 23 in addition to the rotor magnet 24. The shaft 21 is arranged coaxially with the central axis J1 and rotates about the central axis J1. The rotor hub 22 is fixed on the upper portion of the shaft 21 and has a disk mount portion 224 for allowing a disk-shaped storage medium (not shown) to be placed thereon. The rotor yoke 23 is fixed to the rotor hub 22. The rotor magnet 24 is fixed on the rotor yoke 23.

The shaft 21 is formed in an approximately circular cylindrical column, for example. The shaft 21 has at its lower end an increased-diameter portion 211 that is larger in diameter than the remaining portion of the shaft 21.

The rotor hub 22 has a shaft-fixing portion 221 to be fixed to the shaft 21, a cover portion 222, and a cylindrical portion 223 in addition to the disk mount portion 224. The cover portion 222 is arranged at a level lower than the shaft-fixing portion 221 and covers over the stator 32. The cylindrical portion 223 extends downward from the outer periphery of the cover portion 222. The disk mount portion 224 extends radially outward from the cylindrical portion 223 and has a placing surface on which a disk-shaped storage medium (hereinafter, simply referred to as a "disk") is to be placed.

The rotor yoke 23 is fixed onto the inner side surface of the cylindrical portion 223 of the rotor bus 22. In the present preferred embodiment, the rotor yoke 23 is formed by an approximately cylindrical steel plate of a magnetic material. The rotor magnet 24, which also has a substantially cylindrical shape in the present preferred embodiment, is fixed onto the inner side surface of the rotor yoke 23.

The stationary unit 30 includes the base 31 and the stator 32 as described above, and also includes an approximately cylindrical sleeve 33 and a substantially circular plate 34. The sleeve 33 has an inner side surface defining a center hole therein. The inner side surface is to oppose the outer side surface of the shaft 21 when the shaft 21 is inserted into the center hole. The plate 34 closes the lower end of the sleeve 33. The base 31 has a holding cylindrical portion 311 that defines a base center hole therein. The sleeve 33 is to be fixed in the base center hole. The stator 32 is fixed to the outer side surface of the holding cylindrical portion 311.

The base 31 also has a recess 312 and a substantially flat portion (hereinafter, simply referred to as a "flat portion") 313. The recess 312 is formed in a ring shape radially outside the holding cylindrical portion 311. The flat portion 313 is arranged radially outside the recess 312.

The side surface of the recess 312, which is located on the outer periphery of the recess 312, radially opposes the outer side surface of the disk mount portion 224 of the rotor hub 22. In the recess 312, a thrust yoke 35 is arranged to axially oppose to the rotor magnet 24. In the present preferred embodiment, the thrust yoke 35 is an annular member made of a magnetic material, for example.

The holding cylindrical portion 311 is provided, in its radially outer portion, with a stator mount surface 3111, a first outer side surface 3112, and a second outer side surface 3113. The stator mount surface 3111 is substantially annular and flat, and extends in the radial direction. The stator 32 is placed on the stator mount surface 3111. The first outer side surface 3112 extends upward from the radially inner end of the stator mount surface 3111 and radially opposes the inner side surface of the stator 32. The second outer side surface 3113 extends downward from the radially outer end of the stator mount surface 3111 and is continuous with the recess 312. The first outer side surface 3112 is smaller in outer diameter than the second outer side surface 3113.

The stator 32 has a stator core 321 and coil windings 322. The stator core 321 includes a plurality of thin steel plates of a magnetic material stacked on one another. The coil windings 322 are formed by winding a conductive wire in layers around the stator core 321. The outer surface of the stator core 321 radially opposes the inner side surface of the rotor magnet 24, as shown in FIG. 1.

The sleeve 33 has a sleeve inner side surface 331, a first housing recess 332, and a second housing recess 333. The sleeve inner side surface 331 opposes the outer peripheral surface of the shaft 21. The first housing recess 332 houses the increased-diameter portion 211 of the shaft 21. The second housing recess 333 is located under the first housing recess 332 and houses the plate 34. In this arrangement, the increased-diameter portion 211 of the shaft 21 axially opposes the upper surface of the first housing recess 332 and the upper surface of the plate 34 each with a small gap therebetween, as shown in FIG. 1.

The sleeve inner side surface 331 is provided with two groups of radial dynamic pressure generating grooves 3311 formed thereon. Those groups are axially spaced apart from each other. Thrust dynamic pressure generating grooves 3312 are provided on at least one of the upper surface of the first housing recess 332 and the upper surface of the plate 34. The small gaps formed between the sleeve 33 and plate 34 and the shaft 21 are filled with lubricant oil. The rotation of the shaft 21 generates dynamic pressure in the radial dynamic pressure generating grooves 3311 and the thrust dynamic pressure generating grooves 3312, thereby supporting the shaft 21 to be rotatable both in the axial and radial directions. The radial dynamic pressure generating grooves 3311, the thrust dynamic pressure generating grooves 3312, and the lubricant oil constitute the bearing unit BR.

When a current flows through the coil windings 322 of the stator 32, a magnetic field is generated around the stator 32. The magnetic field and the rotor magnet 24 generate a rotating magnetic field to rotate the rotor 20 about the central axis J1.

Figure 2A:
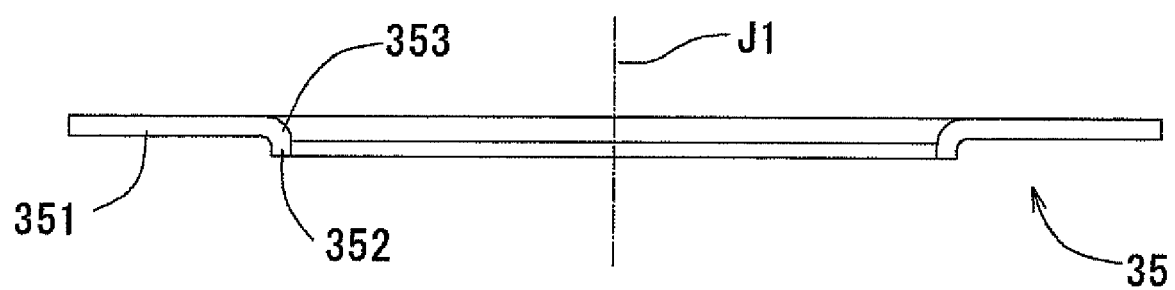
FIG. 2A is a cross-sectional view of a thrust yoke of the motor according to the first preferred embodiment the present invention, taken along with the center axis of the motor.
Figure 2B:
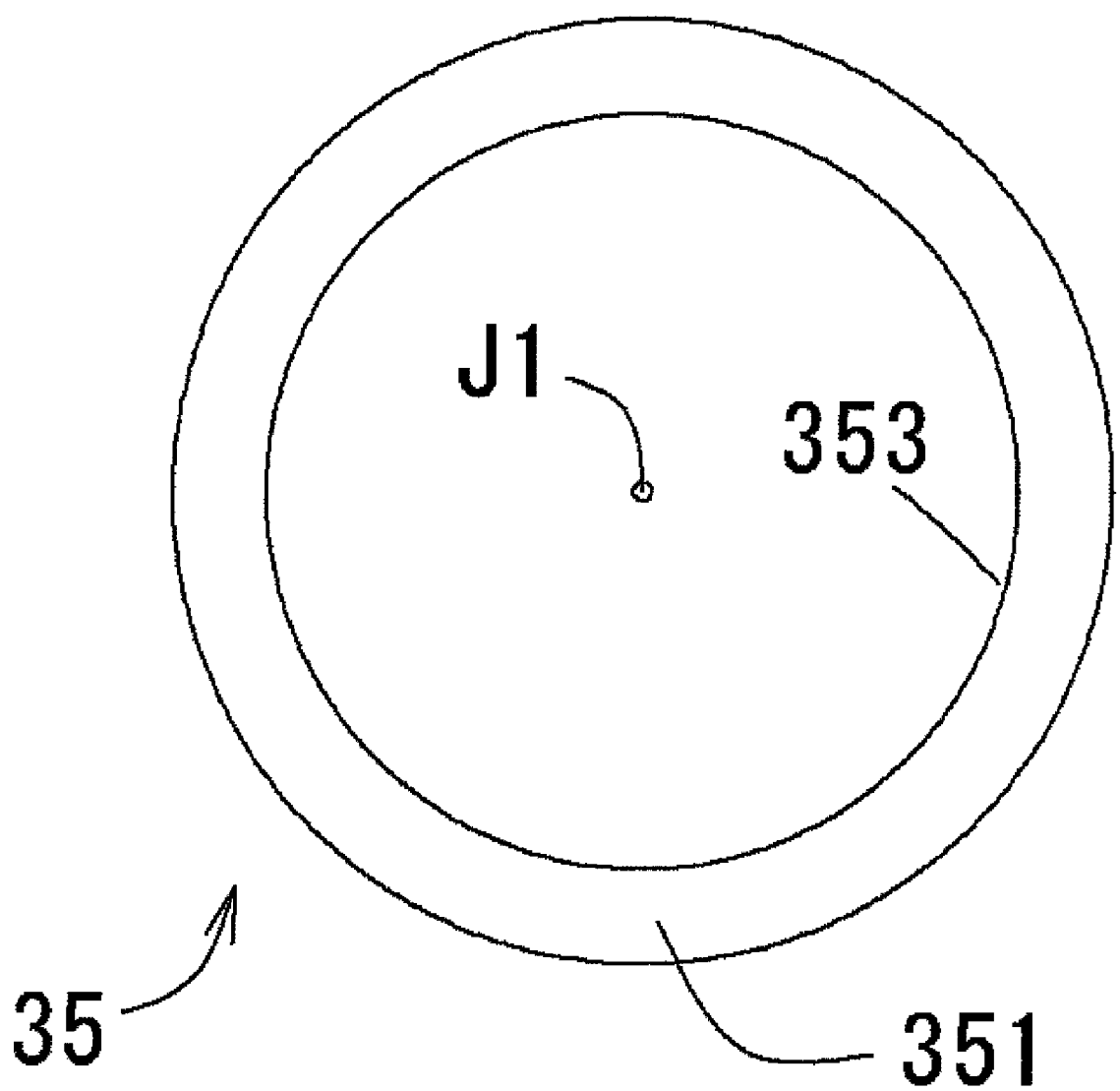
FIG. 2B is a schematic plan view of the thrust yoke of the first preferred embodiment, when viewed from above in an axial direction.
Figure 2C:
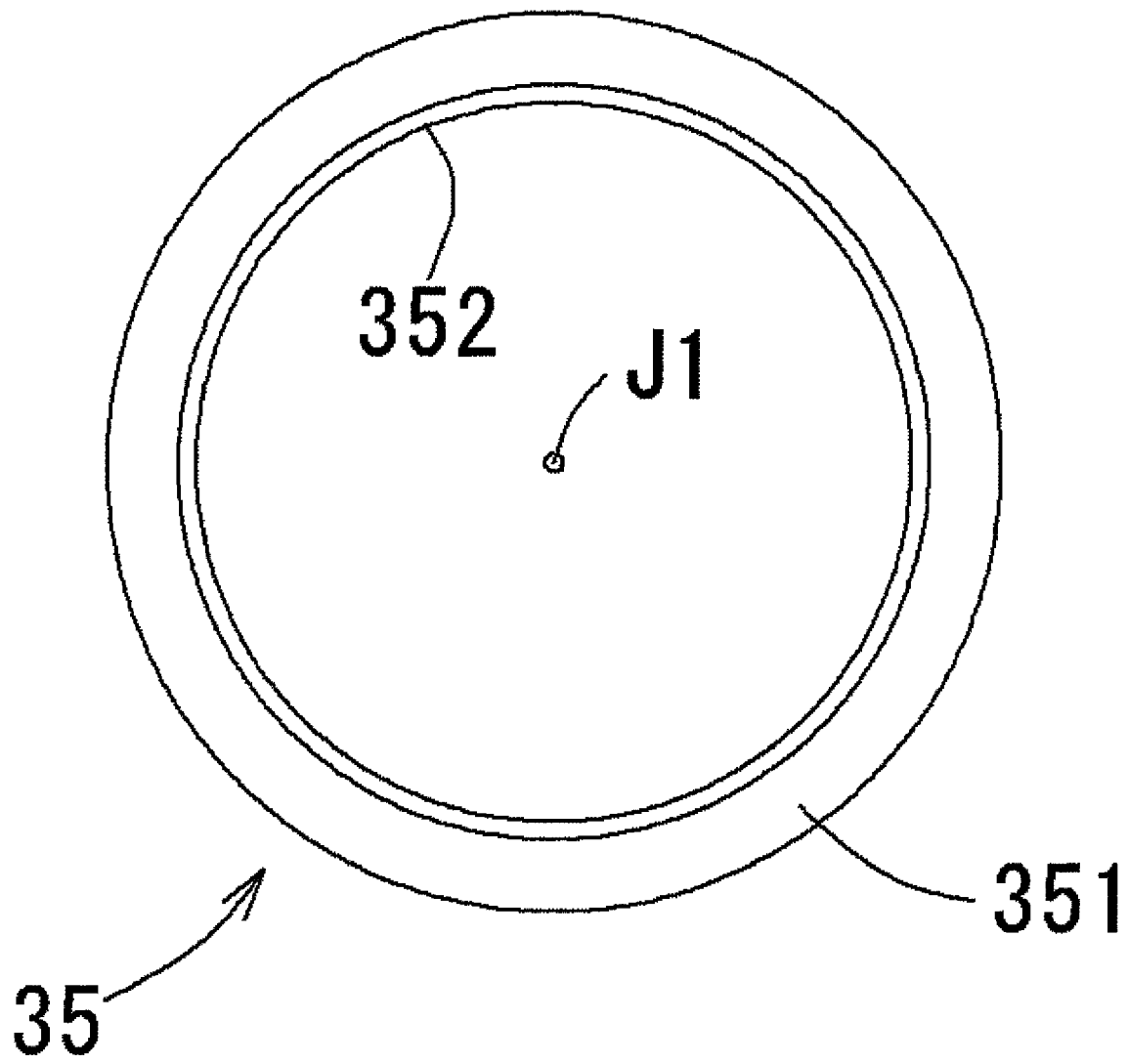
FIG. 2C is a schematic plan view of the thrust yoke of the first preferred embodiment, when viewed from below in the axial direction.
Figure 3A:
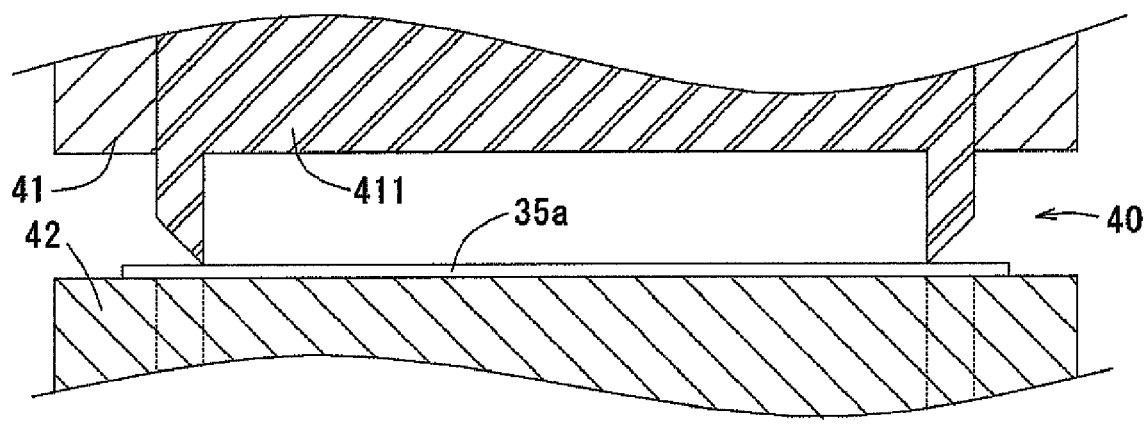
FIGS. 3A and 3B show exemplary dies used in press working for forming the thrust yoke in the first preferred embodiment of the present invention.
Figure 3B:
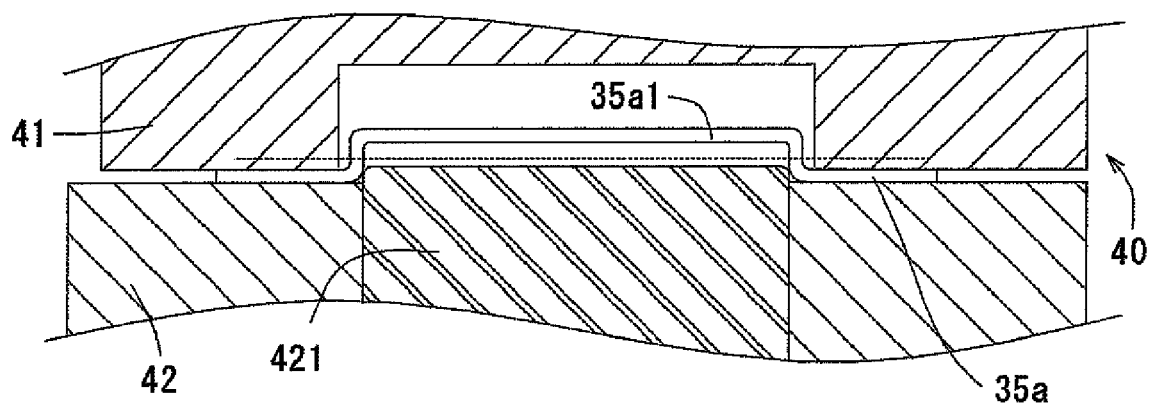
Figure 4:
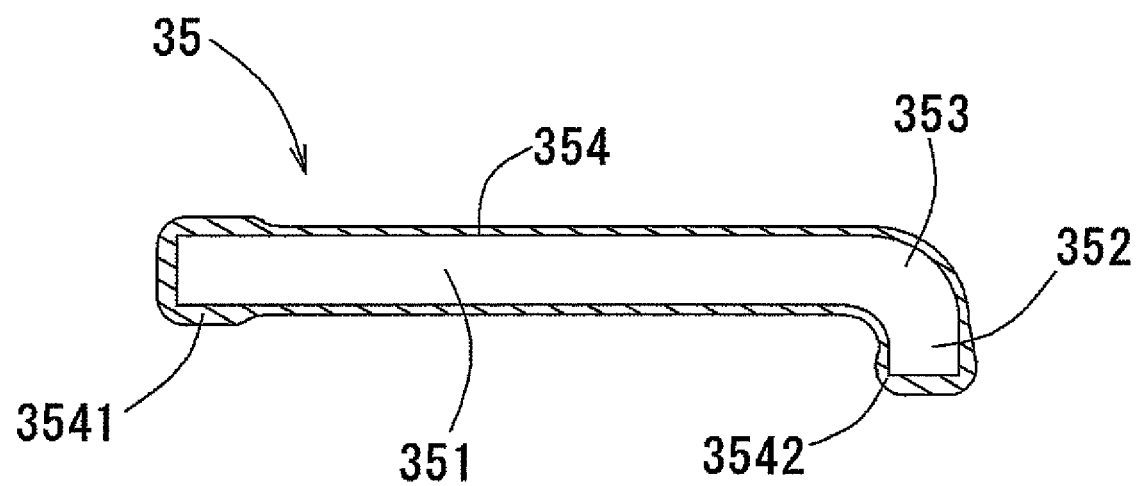
FIG. 4 shows the thrust yoke electroplated with nickel according to the first preferred embodiment of the present invention.

Next, the shape of the thrust yoke 35 in the present preferred embodiment is described referring to FIGS. 2A to 4. FIG. 2A is a cross-sectional view of the thrust yoke 35, taken along a plane containing the center axis J1 of the motor 10. FIG. 2B is a schematic plan view of the thrust yoke 35 when viewed from above. FIG. 2C is a schematic plan view of the thrust yoke 35 when viewed from below. FIGS. 3A and 3B show a portion of exemplary dies used in press working for forming the thrust yoke 35 from a steel plate. FIG. 4 is a schematic view of the thrust yoke 35 that has been electroplated with nickel.

The thrust yoke 35 is formed from a steel plate of a magnetic material through press working. The thrust yoke 35 has a substantially flat portion (hereinafter, simply referred to as a "flat portion") 351, a protruding portion 352, and a bent portion 353, as shown in FIGS. 2A to 2C. The flat portion 351 is substantially annular, for example. The bent portion 353 is bent axially downward from an inner end of the flat portion 351. The protruding portion 352 extends downward from the bent portion 353 so as to protrude downward from the flat portion 351 in the axial direction. The protruding portion 352 is formed in a substantially cylindrical shape in the present preferred embodiment.

Since the thrust yoke 35 is formed through press working in the present preferred embodiment, it can be manufactured at a low cost. Therefore, the motor can be manufactured inexpensively.

In the present preferred embodiment, the thrust yoke 35 is reinforced with the bent portion 353 and the protruding portion 352 as compared to one in which only the flat portion 351 is provided. Accordingly, necessary strength can be ensured in the thrust yoke even when the thickness of the thrust yoke is reduced. This means the structure of the thrust yoke in the present preferred embodiment is advantageous to thickness reduction of the thrust yoke.

Moreover, the protruding portion 352 protrudes axially downward from the radially inner end of the flat portion 351 via the bent portion 353, as described above. This structure enables reduction in the thickness of the thrust yoke, as well as reduction in the axial dimension of the gap between the rotor and the thrust yoke. In addition, the overall height of the motor can be lowered, resulting in thickness reduction of the motor.

Further, the provision of the protruding portion 352 allows a worker to easily hold the thrust yoke. That is, the worker can take hold of the thrust yoke 35 with the protruding portion 352 as a starting point. Therefore, the worker can easily handle the thrust yoke, and the working efficiency of the worker can be improved.

As shown in FIG. 4, an electroplated coating of nickel 354 is formed over the entire surface of the thrust yoke 35 in the present preferred embodiment. In the electroplated coating 354, a portion on the outer side surface and its surrounding portion of the flat portion 351 (hereinafter, simply referred to as a first increased-thickness portion 3541) and another portion on the lower end surface of the protruding portion 352 (hereinafter, simply referred to as a second increased-thickness portion 3542) are thicker than the remaining portion.

The electroplated coating 354 over the entire surface of the thrust yoke 35 can prevent the surface of the thrust yoke 35 from being exposed to ambient air. Thus, the surface of the thrust yoke 35 can be protected against rust. Therefore, a highly reliable and durable motor can be provided.

Press working performed for forming the thrust yoke 35 is now described briefly. Referring to FIG. 3A, a press die 40 includes a first die piece 41 and a second die piece 42. The first die piece 41 is movable in the axial direction of the thrust yoke 35 to be obtained. The first die piece 41 has a punch 411 serving as an upper blade for blanking a steel plate 35a. The second die piece 42 has a die block 421 serving as a lower blade for holding the steel plate 35a against the axial force applied by the punch 411. In this preferred embodiment, the first die piece 41 is arranged axially above the second die piece 42.

The punch 411 of the first die piece 41 cuts the steel plate 35a at the outer peripheral edge which is to be the radially outer peripheral edge of the substantially annular flat portion 351 of the thrust yoke 35. Thus, the steel plate 35a is formed into a substantially annular shape. Then, the steel plate 35a is drawn around its center axially upward by the die block 421 of the second die piece 42, as shown in FIG. 3B, thereby forming a cylindrical portion 35a1. The cylindrical portion 35a1 is cut off along a plane perpendicular to the direction in which the cylindrical portion 35a1 extends, so that the protruding portion 352 of the thrust yoke 35 is formed. The cutting plane is shown with dotted line in FIG. 3B.

In this manner, the steel plate 35a is shaped into the thrust yoke. Note that a side corresponding to the upper surface of the steel plate 35a shown in FIG. 3A, onto which the punch 411 performs blanking, is referred to as a blanked side of the thrust yoke 35.

Upon blanking of the steel plate 35a by the punch 411 of the first die piece 41, burr may be created in substantially the same direction as the direction in which the punch 411 blanks the steel plate 35a, on the surface on the opposite side from the blanked side, the surface corresponding to the lower surface of the steel plate 35a.

In the aforementioned processes, the steel plate 35a which has been cut with the punch 411 of the first die piece 41 is drawn by the die block 421 of the second die piece 42. This drawing can form the cylindrical portion 35a1 without deforming the remaining portion of the steel plate 35a. Moreover, since the second die piece 42 performs drawing on the steel plate 35a, the steel plate 35a can be drawn with its positional accuracy maintained even after the blanking of the steel plate 35a is performed by the first die piece 41.

In the present preferred embodiment, it is desirable to perform electroplating after the thrust yoke 35 is formed by press working for the following reason. If electroplating is performed on a steel plate in advance and then the steel plate is blanked into the shape of the thrust yoke in press working, the outer side surface of the flat portion 351 and the axial end surface of the protruding portion 352 of the thrust yoke 35 are cut surfaces which are not coated with an electroplated coating. That is, these cut surfaces may rust when exposed to ambient air. If electroplating is again performed on the cut surfaces in order to prevent rusting, the number of man-hour for forming the thrust yoke is increased. This increases the number of manufacturing processes of the motor and therefore makes it difficult to provide the motor inexpensively. On the other hand, if electroplating is performed after the thrust yoke is formed through press working, it is possible to provide a rustproof thrust yoke at a lower cost. As a result, a highly reliable motor can be provided without increasing the cost.

Figure 5:
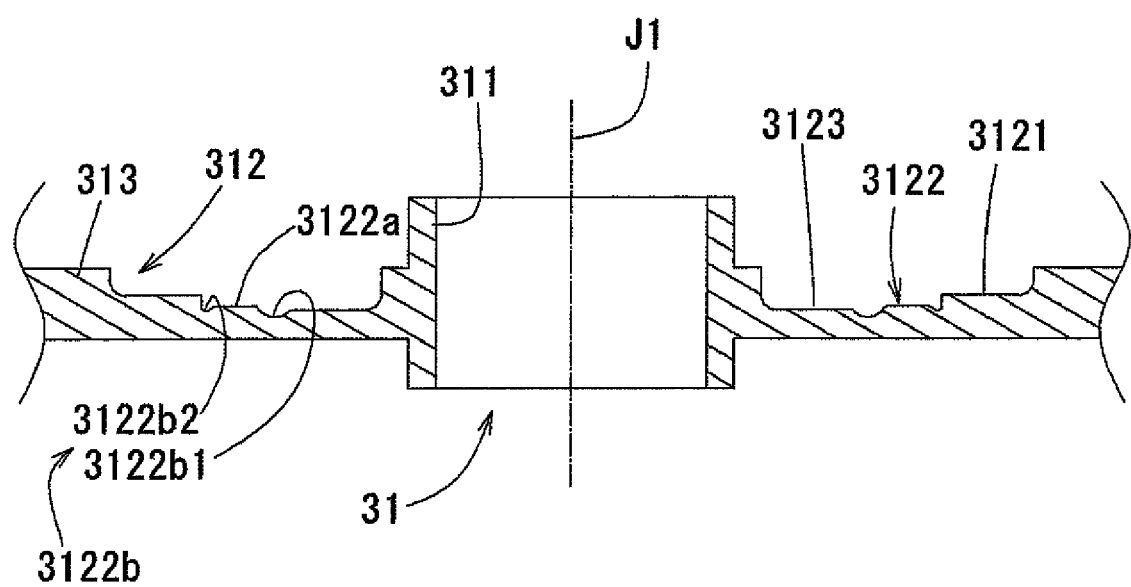
FIG. 5 is a cross-sectional view of a portion of a base of the motor of the first preferred embodiment of the present invention.

Next, the recess 312 of the base 31 in the present preferred embodiment is described with reference to FIG. 5. FIG. 5 is an enlarged cross-sectional view of a portion of the base 31 of FIG. 1.

Referring to FIG. 5, the recess 312 has a first recessed portion 3121, a second recessed portion 3122, and a third recessed portion 3123 all of which are substantially annular. The first recessed portion 3121, the second recessed portion 3122, and the third recessed portion 3123 are continuous with one another.

The first recessed portion 3121 axially opposes the bottom surface of the disk mount portion 224 of the rotor hub 22 (see FIG. 1). The second recessed portion 3122 is arranged radially inside the first recessed portion 3121, and the thrust yoke 35 is fixed on the second recessed portion 3122. The third recessed portion 3123 is arranged radially inside the second recessed portion 3122 and axially opposes the coil windings 322 of the stator 32 (see FIG. 1).

Since the third recessed portion 3123 is formed, it is possible to accommodate a portion of the coil windings 322 in the third recessed portion 3123. Thus, the stator 32 can be arranged at a lower position, as compared with a case where the third recessed portion 3123 is not provided. Consequently, the thickness of the motor can be reduced.

The upper surface of the first recessed portion 3121, i.e., the surface axially opposing the disk mount portion 224, is arranged at a higher level than the upper surface of the second recessed portion 3122, i.e., the surface to which the thrust yoke 35 is to be fixed. The upper surface of the second recessed portion 3122 is arranged at a higher level than the upper surface of the third recessed portion 3123, i.e., the surface axially opposing the coil windings.

The second recessed portion 3122 has a first surface 3122a and second surfaces 3122b. The first surface 3122a is to be contact with the bottom surface of the thrust yoke 35. The second surfaces 3122b are arranged at both sides in the radial direction of the first surface 3122a and are located at axially lower levels than the first surface 3122a, as shown in FIG. 5. Hereinafter, one of the second surfaces 3122b arranged radially inside the first surface 3122a is referred to as an inner second surface 3122b1, and the other second surface 3122b arranged radially outside the first surface 3122a is referred to as an outer second surface 3122b2.

Referring to FIG. 5, the inner second surface 3122b1 is located at a lower level than the outer second surface 3122b2. Also, the inner second surface 3122b1 is located at a lower level than the upper surface of the third recessed portion 3123. Between the outer second surface 3122b2 and the first recessed portion 3121 is formed a wall surface 3121a (see FIG. 6) which extends substantially axially and is substantially annular to surround the outer second surface 3122b2.

In the present preferred embodiment, the base 31 is made of aluminum or aluminum alloy by casting such as die-casting, for example. Therefore, even where the shape of the base 31, especially the shape of the recess 312, is designed more intricately, it can be easily formed.

Figure 6A:
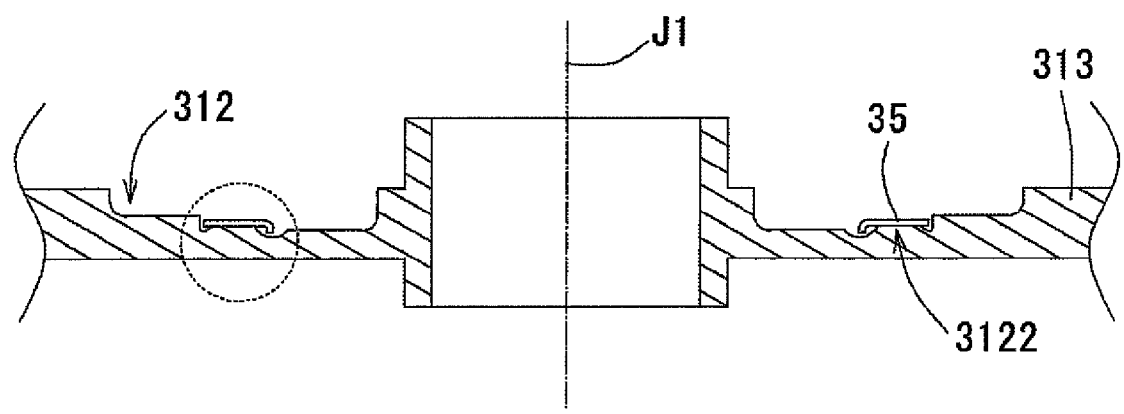
FIGS. 6A and 6B show the thrust yoke arranged on the base according to the first preferred embodiment of the present invention.
Figure 6B:
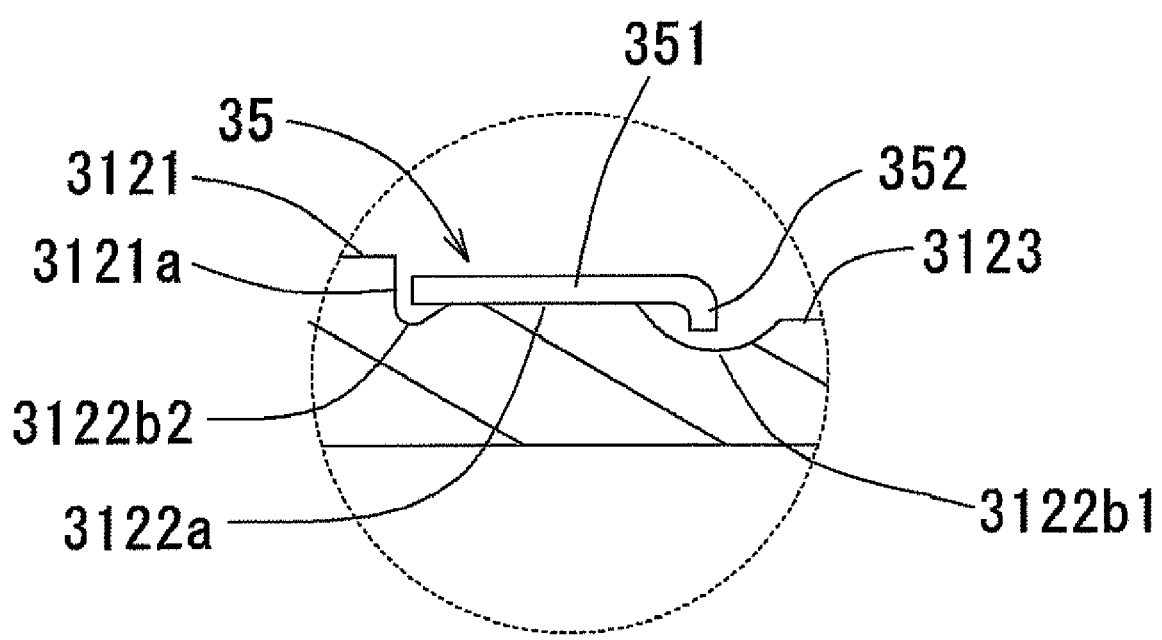

The positional relationship between the thrust yoke 35 and the recess 312 of the base 31 in the present preferred embodiment is now described with reference to FIGS. 6A and 6B. FIG. 6A is a cross-sectional view of the base 31 and the thrust yoke 51 which is disposed in the recess 312 of the base 31. FIG. 6B is an enlarged view of a portion encircled with dotted line in FIG. 6A.

Referring to FIGS. 6A and 6B, the bottom surface of the flat portion 351 of the thrust yoke 35 (the surface on the blanked side) is fixed to the first surface 3122a of the recess 312 of the base 31, for example, with adhesive. The outer peripheral portion of the flat portion 351, which includes the first increased-thickness portion 3541 of the electroplated coating 354, axially opposes the outer second surface 3122b2, as shown in FIG. 6B. More specifically, the bottom surface of the outer peripheral portion of the flat portion 351 axially opposes the outer second surface 3122b2 with a gap therebetween. Similarly, the bottom surface of the inner peripheral portion of the flat portion 351, which includes the lower end surface of the protruding portion 352, axially opposes the inner second surface 3122b1 with a gap therebetween.

In this arrangement, the bottom surfaces of the first increased-thickness portion 3541 and the second increased-thickness portion 3542 of the electroplated coating 354 axially oppose the outer second surface 3122b2 and the inner second surface 3122b1, respectively, with a gap therebetween. Therefore, it is possible to prevent the first increased-thickness portion 3541 and the second increased-thickness portion 3542 from inclining the flat portion 351 of the thrust yoke 35 with respect to the first surface 3122a.

Accordingly, it is possible to make the gap between the lower end surface of the rotor magnet 24 and the upper surface of the thrust yoke 35 substantially uniform in the circumferential direction of the rotor magnet 24. This can contribute to reduction of vibration of the rotor 20 due to the imbalance in magnetic attraction between the thrust yoke 35 and the rotor magnet 24 caused by the inclination of the thrust yoke 35. Also, the noise caused by that vibration of the rotor 20 can be reduced. Thus, a motor with reduced vibration and reduced noise can be obtained.

Moreover, the gap is formed between the outer peripheral portion of the flat portion 351 of the thrust yoke 35 and the outer second surface 3122b2 in the present preferred embodiment. Therefore, even if burr is created at the lower edge of the outer periphery of the flat portion 351 of the thrust yoke 35 by press working, the burr can be accommodated in the gap. That is, the burr cannot come into contact with the outer second surface 3122b2.

In addition, even in a case where burr which extends radially outward is created on the lower end surface of the protruding portion 352, the burr cannot come into contact with the inner second surface 3122b1 in the present preferred embodiment. This is because the axial end surface of the protruding portion 352 and the inner second surface 3122b1 radially and axially oppose each other with a gap therebetween, as shown in FIG. 6B.

Hence, it is possible to prevent inclination of the thrust yoke 35 relative to the first surface 3122a from being caused by burr that may be created on the outer periphery of the flat portion 351 and the lower end surface of the protruding portion 352 of the thrust yoke 35.

In addition, the wall surface 3121a of the base 31, which is located between the outer second surface 3122b2 and the first recessed portion 3121, radially opposes the outer side surface of the flat portion 351 of the thrust yoke 35 with a gap therebetween, as shown in FIG. 6B. The wall surface 3121a extends further upward in the axial direction from the upper surface of the flat portion 351 of the thrust yoke 35.

As described above, the thrust yoke 35 is fixed to the base 31 with adhesive in the present preferred embodiment. The adhesive is applied between the first surface 3122a of the base 31 and the lower surface of the flat portion 351 of the thrust yoke 35. In a case where the adhesive is applied on the first surface 3122a, a portion of the adhesive moves toward the inner second surface 3122b1 and the outer second surface 3122b2 when the bottom surface of the flat portion 351 of the thrust yoke 35 is brought into contact with the adhesive on the first surface 3122a. The inner second surface 3122b1 and the outer second surface 3122b2 can accommodate that portion of the adhesive, i.e., excess adhesive that is squeezed out when the thrust yoke 35 is pressed against the first surface 3122a. That is, the excess adhesive can be removed from the first surface 3122a. The adhesive remaining on the first surface 3122a can be interposed between the thrust yoke 35 and the first surface 3122a substantially uniformly in the circumferential direction. Consequently, inclination of the thrust yoke 35 relative to the base 31 can be prevented, thus reducing vibration of the rotor 20 in the motor and the noise caused by that vibration in the motor.

In the present preferred embodiment, the gaps between the lower surface of the protruding portion 352 and the inner second surface 3122b1 and between the lower end of the outer periphery of the flat portion 351 and the outer second surface 3122b2 are also filled with adhesive. Thus, the thrust yoke 35 is also fixed to the inner second surface 3122b1 and the outer second surface 3122b2 with the adhesive, and therefore the thrust yoke 35 can be fixed onto the base 31 more firmly. Accordingly, it is possible to prevent detachment of the thrust yoke 35 from the base 31 in the event of external impact force or the like being applied to the motor 10. As a result, a highly reliable motor can be provided.

The adhesive in the gap between the lower surface of the protruding portion 352 and the inner second surface 3122b1 and the gap between the lower end of the outer periphery of the flat portion 351 and the outer second surface 3122b2 may cover the outer side surface of the flat portion 351 and the lower end surface of the protruding portion 352, respectively. In this case, the outer peripheral surface of the flat portion 351 and the lower end surface of the protruding portion 352 are covered with the adhesive even if the thrust yoke is press-formed from a steel plate that has been electroplated with nickel. Therefore, rust growth can be inhibited.

In this case, it is possible to use a more inexpensive thrust yoke as compared with a case in which electroplating is performed after the shaping of the thrust yoke. Therefore, a highly reliable motor can be provided at a lower cost. Particularly, the adhesive can be retained between the wall surface 3121a and the upper surface of the flat portion 351 in the present preferred embodiment in which the wall surface 3121a that radially opposes the flat portion 351 of the thrust yoke 35 is provided at an axially higher level than the upper surface of the flat portion 351. Accordingly, the outer side surface of the flat portion 351 can be covered with the adhesive even more reliably. As a result, the rust growth on the thrust yoke 35 can be inhibited.

Figure 7:
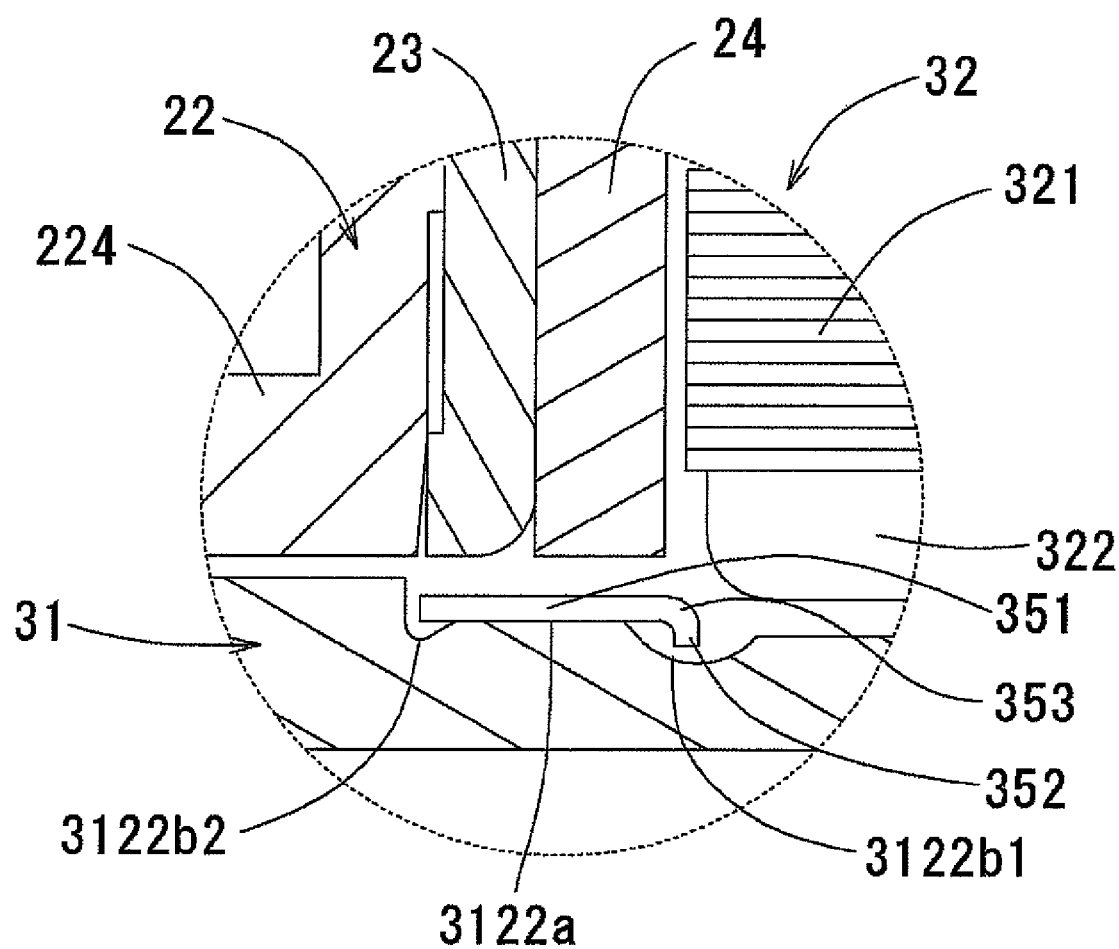
FIG. 7 is an enlarged view of a portion encircled with dotted line in FIG. 1.

Next, the positional relationship between the thrust yoke 35 and the rotor magnet 24 in the present preferred embodiment is described with reference to FIG. 7. FIG. 7 is an enlarged view of a portion encircled with dotted line in FIG. 1.

As shown in FIG. 7, the first surface 3122a of the base 31 axially opposes the lower end surface of the rotor magnet 24 with the flat portion 351 of the thrust yoke 35 arranged therebetween. In this arrangement, the gap between the lower end surface of the rotor magnet 24 and the upper surface of the flat portion 351 opposing thereto can be made substantially uniformly in the circumferential direction of the rotor magnet 24 with high accuracy.

The thrust yoke 35 extends further radially inward than the inner side surface of the rotor magnet 24. The thrust yoke 35 also extends further radially outward than the outer side surface of the rotor magnet 24 up to the outer side surface of the rotor yoke 23. Thus, it is possible to prevent magnetic saturation of the thrust yoke 35 even at a reduced thickness of the thrust yoke 35, since the radial width of the thrust yoke 35 is taken sufficiently large. Therefore, iron loss of the thrust yoke 35 can be avoided. This is especially advantageous to high-speed rotation of the motor 10.

Figure 8:
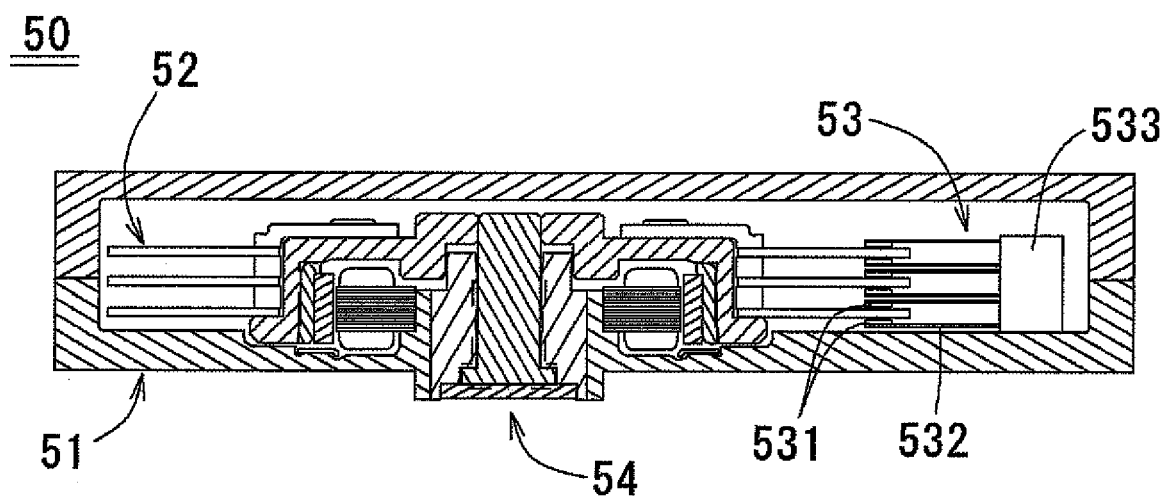
FIG. 8 is a cross-sectional view of a disk drive according to the first preferred embodiment of the present invention.

Next, an exemplary disk drive mounted with the motor 10 of the present preferred embodiment is described referring to FIG. 8. FIG. 8 is a cross-sectional view of a disk drive 50.

The disk drive 50 includes a housing 51 which has a substantially rectangular cross section, as shown in FIG. 8. The housing 51 defines a dustless, extremely clean space therein. A motor 54 with a hard disk 52 which is a disk capable of storing data is arranged inside the housing 51. Please note that the motor 54 has the same structure and functions as the motor 10 of FIG. 1.

An access unit 53 which can access the hard disk 52 when data is read from and/or written onto the hard disk 52 is arranged inside the housing 51. The access unit 53 includes a magnetic head 531 that can magnetically read data from and/or write data on the hard disk 52, an arm 532 supporting the magnetic head 531, and an actuator portion 533 which can move the magnetic head 531 and the arm 532 to a desired position over the hard disk 52.

By using the motor 10 of the present preferred embodiment as the motor 54 of the disk drive 50 of this type, it is possible to reduce vibration of the rotor 20 caused by the thrust yoke 35 and the noise arising from the vibration, and thus a disk drive with reduced vibration and noise can be obtained.

Moreover, the motor 10 can be adapted to high-speed rotation with the structure in which the radial width of the thrust yoke 35 is increased so as to make the thrust yoke 35 thin as well as to enhance the upper limit in magnetization of the thrust yoke 35 up to magnetic saturation. This structure is desirably applied especially to disk drives for servers, in which the motor 10 is required to rotate at high speeds.

It should be noted that the base 31 of FIG. 1 and the housing 51 of FIG. 8 are formed by a single member in this example. However, the present invention is not limited thereto. The base and the housing may be formed by separate members, and the base is fixed to the housing.

Second Preferred Embodiment

Figure 9:
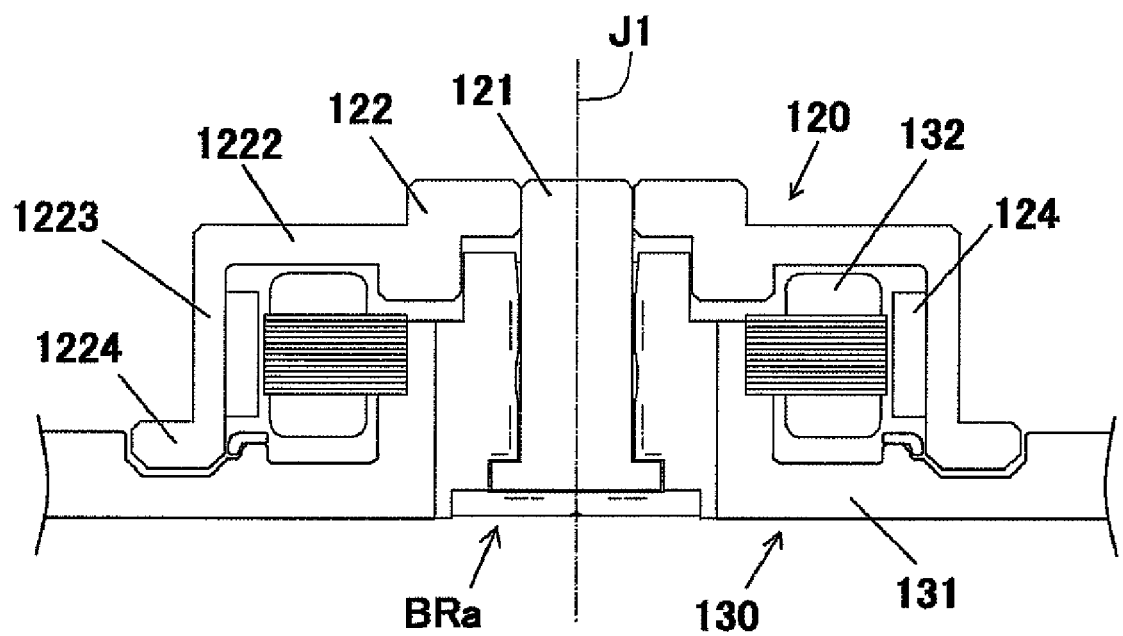
FIG. 9 is a cross-sectional view of a motor according to a second preferred embodiment of the present invention, taken along with a plane containing a center axis thereof.
Figure 10:
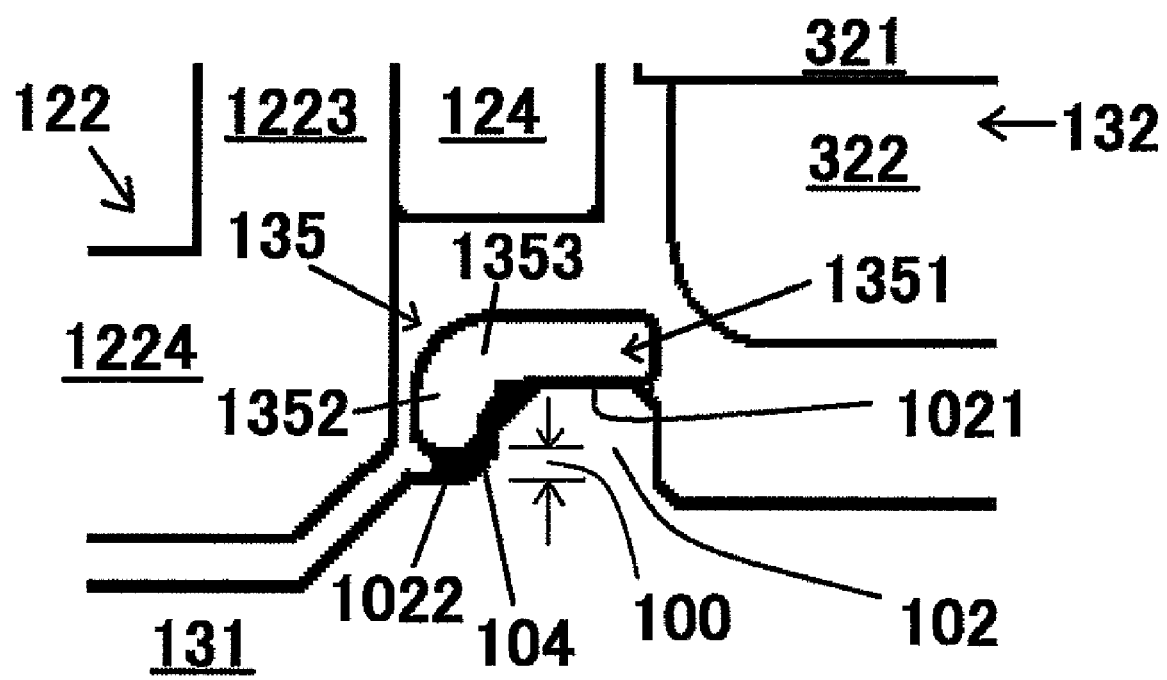
FIG. 10 is an enlarged cross-sectional view of a portion of the motor of FIG. 9.

A motor of a second preferred embodiment of the present invention is now described referring to FIGS. 9 and 10. FIG. 9 is a cross-sectional view of the motor of this preferred embodiment, taken along a plane containing a center axis J1 thereof. FIG. 10 is an enlarged view of a portion of the motor of FIG. 9. The motor of this preferred embodiment includes a rotor 120 having a rotor magnet 124, a stationary unit 130, and a bearing unit BRa which supports the rotor 120 to be rotatable relative to the stationary unit 130

The stationary unit 130 includes a stator 132 and a base 131 arranged to hold the stator 132. The stator 132 has a stator core 321 and coil windings 322 arranged around the stator core 321.

The rotor 120 includes a shaft 121 arranged coaxially with the center axis J1, a rotor hub 122, and the rotor magnet 124. The rotor hub 122 has a cover portion 1222, a cylindrical portion 1223 extending downward from the outer periphery of the cover portion 1222, and a disk mount portion 124 extending radially outward from the lower end of the cylindrical portion 1223.

As shown in FIG. 10, a thrust yoke 135 is fixed to the base 131 of the stationary unit 130, for example, with adhesive 104. The thrust yoke 135 is arranged radially outside the coil windings 322 but radially inside the cylindrical portion 1223 of the rotor hub 122. In the axial direction, the thrust yoke 135 is arranged below the rotor magnet 124 to oppose the rotor magnet 124 with a gap therebetween.

The thrust yoke 135 has a substantially flat portion (hereinafter, simply referred to as a "flat portion") 1351, a protruding portion 1352, and a bent portion 1353 connecting the flat portion 1351 and the protruding portion 1352 to each other. The bent portion 1353 is arranged radially outside the flat portion 1351 and is bent downward from the outer periphery of the flat portion 1351. The protruding portion 1352 extends downward from the bent portion 1353. In the axial direction, the lower end of the protruding portion 1352 opposes the base 131 with a gap 100 therebetween. In the radial direction, the protruding portion 1352 and the bent portion 1353 oppose the inner side surface of the cylindrical portion 1223 of the rotor hub 122.

The base 131 has a flange portion 102 which protrudes higher than a portion of the base 131 axially opposing the disk mount portion 1224 of the rotor hub 122, as shown in FIG. 10. The flange portion 102 has a first surface 1021 that is to be in contact with the bottom surface of the flat portion 1353, and a second surface 1022 that axially opposes the lower end of the protruding portion 1352 with the gap 100 arranged therebetween. The axial dimension of the gap 100 defined between the second surface 1022 and the lower end of the protruding portion 1352 gradually increases radially outward in this preferred embodiment.

A space between the flange portion 102 including the first and second surfaces 1021 and 1022 and the thrust yoke 135 is filled with the aforementioned adhesive 104 in this preferred embodiment. The interface of the adhesive 104 and air forms a meniscus in the gap 100.

Due to the adhesive 104 in the space between the protruding portion 1352 and the bent portion 1353 and the flange portion 102, including the gap 100, the thrust yoke 135 and the flange portion 102 can be more firmly fixed to each other. Since the adhesive is held in that space, the bonding strength required for fixing the thrust yoke 135 and the flange portion 102 to each other can be obtained. Accordingly, the radial dimension of the thrust yoke 135 can be reduced as compared with a conventional motor.

Since the radial dimension of the thrust yoke 135 can be reduced in this preferred embodiment, the thrust yoke 135 can be arranged radially inside the cylindrical portion 1223 of the rotor hub 122. Therefore, the axial height of the disk mount portion 1224 can be reduced. This enables the number of the disks mounted on the rotor hub 122 to be increased. For example, three disks can be mounted on the rotor hub 122.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

Figure 11:
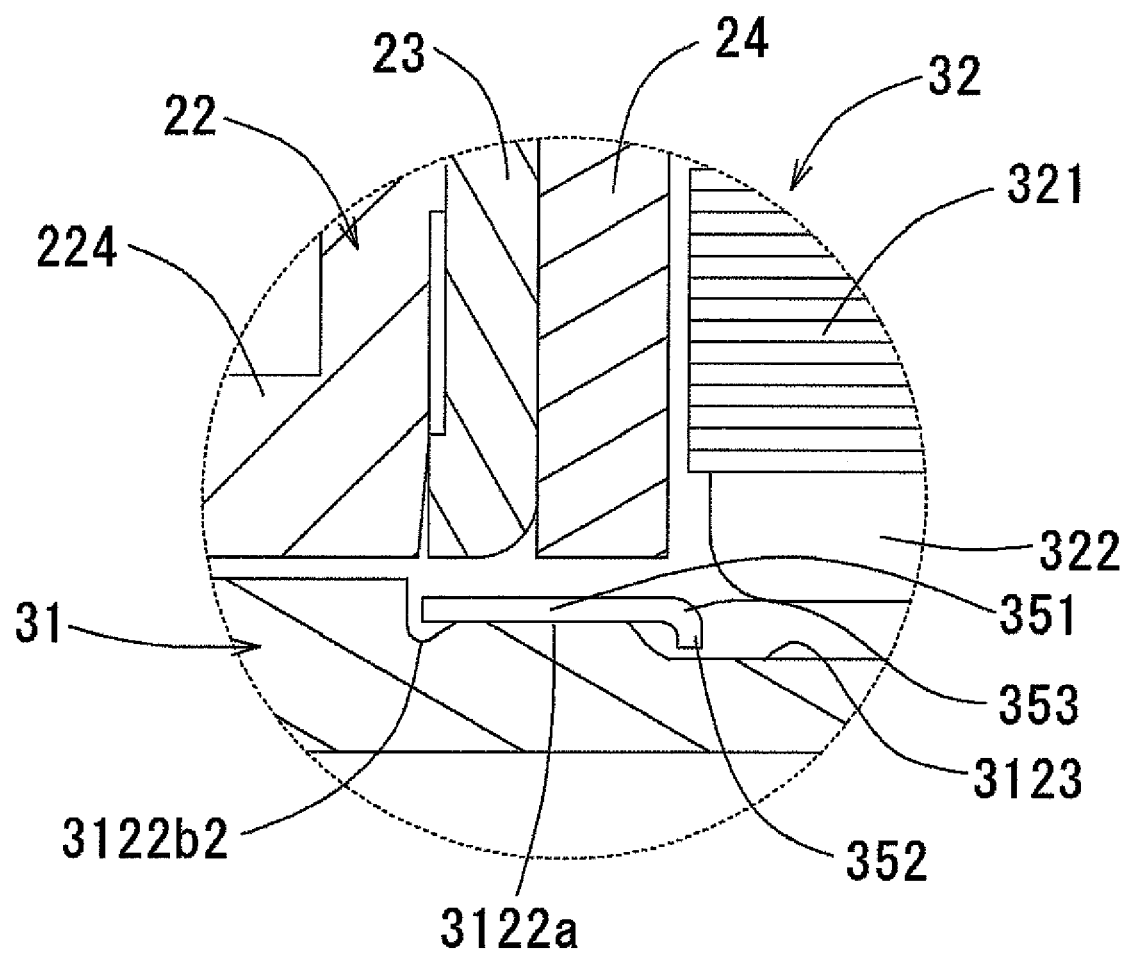
FIG. 11 shows another exemplary arrangement of the thrust yoke and the base in the motor.

For instance, the inner second surface 3122*b*1 and the upper surface of the third recessed portion 3123 are provided separately from each other in the motor 10 of the first preferred embodiment. However, the present invention is not limited thereto. The inner second surface and the third recessed portion may lie on the same plane as shown in FIG. 11, for example.

In addition, electro-nickel plating is utilized in the first preferred embodiment for rustproof treatment. However, the present invention is not limited thereto. For example, conventional electroless-nickel plating may also be used.

Also, the shaft is rotated relative to the sleeve in the foregoing preferred embodiments. However, the present invention is not limited thereto. The present invention can be applied to motors of the type in which the shaft is fixed and the sleeve is rotated relative to the shaft. In this case, the rotor hub is fixed on the outer peripheral portion of the sleeve and the sleeve is rotated with the rotor hub.

Further, the bent portion and the protruding portion are provided at the inner periphery of the thrust yoke in the first preferred embodiment. However, the present invention is not limited thereto. That is, the bent portion and the protruding portion may be provided at the outer periphery of the thrust yoke, or at both of the inner periphery and the outer periphery of the thrust yoke.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor for a disk drive comprising:
    a rotor including a rotor magnet rotatable about a center axis;
    a stationary unit including a stator opposing the rotor magnet with a first gap therebetween, and a thrust yoke made of a magnetic material and arranged below the rotor magnet to axially oppose the rotor magnet with a second gap therebetween; and
    a bearing unit arranged to support the rotor to be rotatable, wherein the thrust yoke includes:
    a flat portion axially opposing the rotor magnet with the second gap therebetween;
    a bent portion arranged at least one of an inner periphery and an outer periphery of the flat portion to be bent downward from the flat portion;
    a protruding portion extending downward from the bent portion; and
    the flat portion is in contact with a portion of the stationary unit with the protruding portion axially spaced apart from the portion of the stationary unit.

2. The motor according to claim 1, wherein the portion of the stationary unit includes a first surface and a second surface arranged at a lower level than the first surface,
    the first surface is in indirect contact with the bottom surface of the flat portion, and the second surface axially opposes the protruding portion with a third gap therebetween.

3. The motor according to claim 2, wherein the thrust yoke is fixed to the portion of the stationary unit with adhesive, and
    the adhesive is arranged between the flat portion and the first surface and in the third gap formed between the protruding portion and the second surface.

4. The motor according to claim 1, wherein the thrust yoke is fixed to the portion of the stationary unit with adhesive.

5. The motor according to claim 1, wherein the bent portion and the protruding portion of the thrust yoke are arranged radially inside the flat portion which is arranged substantially perpendicular to the center axis.

6. The motor according to claim 5, wherein the outer periphery of the flat portion is spaced apart from the portion of the stationary unit.

7. The motor according to claim 1, wherein the thrust yoke is fixed to a portion of the stationary unit with adhesive.

8. The motor according to claim 1, wherein the bent portion and the protruding portion are arranged radially inside the flat portion which is arranged substantially perpendicular to the center axis.

9. The motor according to claim 1, wherein the stator is arranged radially inside the rotor magnet which is arranged substantially perpendicular to the center axis, and
    the protruding portion is arranged below the stator.

10. The motor according to claim 1, wherein the thrust yoke is formed by a single member.

11. The motor according to claim 1, wherein the thrust yoke is electroplated to form a coating on the thrust yoke.

12. The motor according to claim 11, wherein the coating is thicker at the protruding portion than on a remaining portion of the thrust yoke.

13. The motor according to claim 1, wherein the bent portion and the protruding portion are arranged radially outside the flat portion which is arranged substantially perpendicular to the center axis.

14. The motor according to claim 13, wherein the rotor includes a rotor hub including a cylindrical portion to which the rotor magnet is to be attached, and
    the bent portion and the protruding portion oppose, in the radial direction, an inner side surface of the cylindrical portion.

15. A disk drive comprising:
    a disk-shaped storage medium arranged to store data therein;
    the motor according to claim 1 arranged to spin the disk-shaped storage medium;
    an access unit arranged to perform at least one of reading data from and writing data on the disk-shaped storage medium; and
    a housing arranged to accommodate the motor and the access unit therein.

* * * * *